United States Patent [19]
Weyandt

[11] Patent Number: 5,772,565
[45] Date of Patent: Jun. 30, 1998

[54] HEAT SEALER

[75] Inventor: Ronald R. Weyandt, Chesterland, Ohio

[73] Assignee: Automated Packaging Systems, Inc., Streetsboro, Ohio

[21] Appl. No.: 521,211

[22] Filed: Aug. 30, 1995

[51] Int. Cl.⁶ ............................. B31B 49/00; B31B 23/60
[52] U.S. Cl. ................................... 493/8; 493/10; 493/27; 493/193; 493/209; 53/77; 53/570
[58] Field of Search ............................. 493/3, 8, 10, 13, 493/14, 15, 27, 31–33, 189, 193, 209; 53/77, 373.7, 374.8, 374.9, 567, 570; 156/350–352, 358, 359, 583.1, 583.2

[56] References Cited

U.S. PATENT DOCUMENTS

| | | |
|---|---|---|
| 3,375,777 | 4/1968 | Techtmann et al. .................... 53/374.9 |
| 3,477,196 | 11/1969 | Lerner . |
| 3,610,464 | 10/1971 | Loughry . |
| 3,815,318 | 6/1974 | Lerner . |
| 3,882,656 | 5/1975 | Lerner . |
| 3,965,653 | 6/1976 | Lerner . |
| 4,014,154 | 3/1977 | Lerner . |
| 4,128,985 | 12/1978 | Simmons ..................................... 53/77 |
| 4,367,115 | 1/1983 | Bohn et al. . |
| 4,390,384 | 6/1983 | Turner . |
| 4,479,844 | 10/1984 | Yamada . |
| 4,529,859 | 7/1985 | Minney et al. . |
| 4,546,596 | 10/1985 | Cherney . |
| 4,607,252 | 8/1986 | Neri ............................................. 3/77 |
| 4,713,047 | 12/1987 | Klinkel . |
| 4,734,142 | 3/1988 | Creswell . |
| 4,829,752 | 5/1989 | Focke et al. . |
| 4,899,520 | 2/1990 | Lerner et al. ........................... 53/374.8 |
| 4,901,506 | 2/1990 | Weyandt . |
| 4,928,455 | 5/1990 | Gereby et al. . |
| 5,027,577 | 7/1991 | Creswick ................................... 53/77 |
| 5,041,148 | 8/1991 | Gereby et al. . |
| 5,070,674 | 12/1991 | Lerner et al. . |
| 5,077,958 | 1/1992 | Peppard et al. . |
| 5,110,381 | 5/1992 | Heckard et al. . |
| 5,134,833 | 8/1992 | Lerner et al. . |
| 5,225,025 | 7/1993 | Lambing et al. . |
| 5,259,172 | 11/1993 | Peppard et al. . |
| 5,265,402 | 11/1993 | Lerner et al. . |
| 5,289,671 | 3/1994 | Lerner et al. ............................. 53/479 |
| 5,322,586 | 6/1994 | McLean . |
| 5,341,625 | 8/1994 | Kramer ..................................... 53/459 |
| 5,381,640 | 1/1995 | Chiu ....................................... 53/374.9 |
| 5,394,674 | 3/1995 | Peppard et al. . |
| 5,394,676 | 3/1995 | Lerner et al. . |
| 5,466,326 | 11/1995 | Cherney ..................................... 493/8 |
| 5,499,485 | 3/1996 | Lerner et al. ............................. 53/567 |
| 5,540,802 | 7/1996 | Totani ......................................... 493/8 |
| 5,568,718 | 10/1996 | Lerner et al. ............................... 53/77 |
| 5,570,568 | 11/1996 | Kramer ....................................... 53/77 |
| 5,618,252 | 4/1997 | Melville ................................... 493/27 |

Primary Examiner—Michael J. Carone
Assistant Examiner—Darren Ark
Attorney, Agent, or Firm—Watts, Hoffmann, Fisher & Heinke, Co., L.P.A.

[57] ABSTRACT

A seal assembly for packaging machines facilitates the heat sealing of layers of material at the mouth of loaded bags. An operator may insert the layers of material between a pressure pad and a seal member positioned in a spaced position. Upon activation of a switch by the operator, an oscillating signal is applied to a solenoid to actuate movement of the pressure pad toward the seal member with a relatively soft force. An optical sensor senses when the pressure pad moves within a predetermined distance from the seal member and generates a sensor signal. In response to the sensor signal, a relatively constant voltage signal is applied to the solenoid to actuate movement of the pressure pad with a relatively high seal or clamping force to secure the layers of material against the seal member. The sensor signal also triggers energization of a heating element carried by the seal member to effectuate the heat seal between the layers of material. In this manner, damage to an object that becomes situated or jammed between the pressure pad and the seal member is minimized or avoided as such jammed objects prevent application of the clamping force and energization of the heating element. Such objects may be also be removed in a relatively easy manner because of the relatively soft force with which the pressure member exerts upon such objects.

22 Claims, 5 Drawing Sheets

HEAT SEALER

BACKGROUND OF THE INVENTION

1. Field of the Invention

The present invention relates generally to packaging machines and more particularly to sealers for packaging machines.

2. Description of the Related Art

Various packaging machines and techniques are known to facilitate the loading of thermoplastic bags with objects and the subsequent sealing of such loaded bags.

With a simple sealing technique, an operator inserts the mouth of a loaded bag between a pressure pad and heating element. The pressure pad and heating element are then moved relative to one another to clamp the mouth of the bag, and the heating element effects a heat seal to seal the mouth of the bag.

A typical sealing mechanism may be damaged by or inflict damage to foreign objects that become situated or jammed between the pressure pad and the heating element during the sealing process. Despite obstruction by such objects, a typical sealing mechanism continues to force the pressure pad and the heating element toward a clamping position and may thereby damage the obstructing object and/or the sealing mechanism itself. As the heating element is actuated for sealing, the obstructing object may also become heat damaged.

One proposal for a heat sealer relies on the changing force of a D.C. solenoid as its core enters the magnetic field. This proposal would utilize an air damper as a buffer to cushion the force applied to a foreign object trapped between closing jaws of the sealer. One shortcoming of this proposal is that once the air in the buffer has bled off, the cushion is obviously lost. Moreover with this proposal, as the sealer jaws would close the closing force would constantly increase so the smaller and more fragile an object between the jaws, the greater the chance of damage.

U.S. Pat. No. 5,289,671, entitled PACKAGING MACHINE AND METHOD and assigned to the assignee of the present patent, disclosed a jam prevention device. This device relies on a light beam source and photosensor for detecting a foreign object if between closing jaws of a sealer. As the jaws close, reflective devices are moved into the path of the light beam emitted from the source to reflect the light beam toward the photosensor. Because the light beam or its reflection may be disrupted by the presence of a foreign object, the sealing process may continue or be aborted based upon detection of the light beam. While the jam prevention system is an important part of a highly successful automatic packaging machine, it is too costly and complicated for a basic, essentially manually-operated bagging machine.

DISCLOSURE OF THE INVENTION

One object of the present invention is to provide for a seal assembly that minimizes or avoids damage to foreign objects that become situated or jammed in the seal assembly.

Another object of the present invention is to provide for a seal assembly that minimizes or avoids damage to the seal assembly despite the situation or jamming of a foreign object in the seal assembly.

Unlike prior machines, the closing force applied to the jaws of a sealer made in accordance with the present invention remains at a substantially constant low level until substantial abutment is established. This low level force is readily overcome by virtually any object that may be between the jaws as they close, thus minimizing the possibility of damage to such an object and the jaws. Once substantial abutment is established and sensed, this closing force is abruptly increased to a level suitable for effecting a seal while a heating element is energized to effectuate the seal.

In accordance with the present invention, a method for forming a seal between at least two layers of material is disclosed. For the method, a seal assembly is actuated to move with an initial, relatively low force from a spaced position toward a seal position to seal the layers of material. When the seal assembly reaches a seal-ready position, the seal assembly is actuated to move to the seal position with a seal force greater than the initial force. The layers of material are sealed when the seal assembly is in the seal position.

An apparatus for moving a seal assembly from a spaced position to a seal position is also disclosed. The seal assembly includes relatively moveable components, and the apparatus includes a solenoid interposed between the components for relatively moving the components from the spaced position to the seal position and a sensor for generating a sensor signal when the components reach a seal-ready position. The apparatus also includes circuitry coupled to the solenoid and to the sensor. The circuitry is responsive to a switch for applying an oscillating signal to the solenoid to move the components with an initial, relatively low force toward the seal position. The circuitry is also responsive to the sensor signal for applying a relatively constant voltage signal to the solenoid to apply a relatively high seal force to the components when in the seal position.

Additionally, an apparatus for forming a seal between at least two layers of material is disclosed. The apparatus includes a seal member, a pressure member for securing the layers of material in relation to the seal member, and support structure supporting the seal member and the pressure member for positioning the pressure member and the seal member in a spaced position to allow the layers of material to be inserted between the pressure member and the seal member and in a seal position to seal the layers of material.

The apparatus also includes a sensor operatively connected with the support structure for generating a sensor signal when the pressure member and the seal member reach a seal-ready position. An actuator is operatively connected with the support structure and coupled to the sensor for actuating relative movement of the pressure member and the seal member from the spaced position toward the seal position with an initial, relatively low force.

The actuator is responsive to the sensor signal for applying a seal force greater than the initial force to the pressure member and the seal member when in the seal position. The apparatus further includes a heating element carried by the seal member for heating the layers of material when the pressure member and the seal member are in the seal position.

Other objects, features, and advantages of the present invention will be apparent from the accompanying drawings and from the detailed description that follows below.

DETAILED DESCRIPTION

Figure 1:
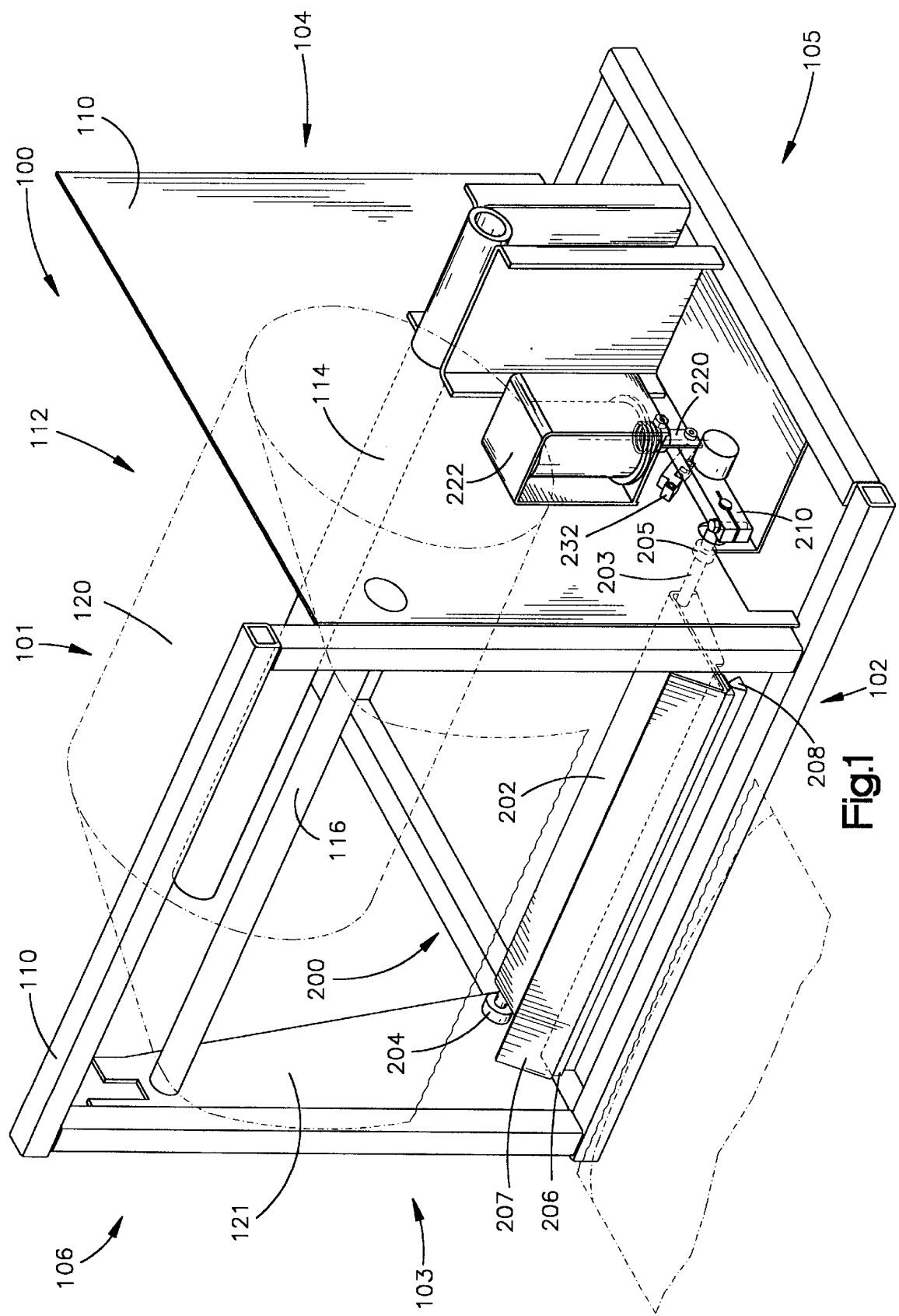
FIG. 1 is a perspective view of a packaging apparatus equipped with the seal assembly of the present invention.
Figure 2:
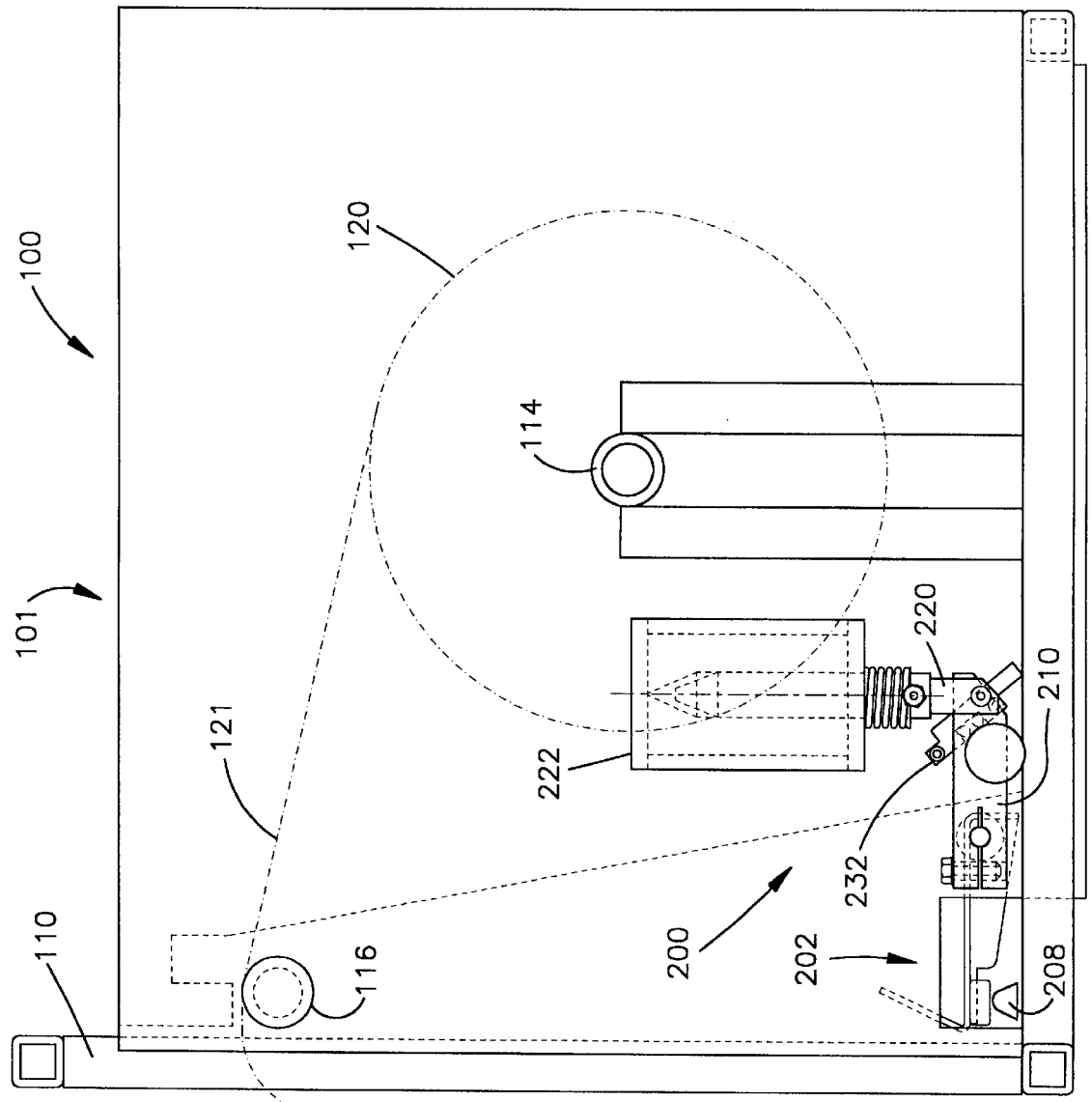
FIG. 2 is a side elevational view of the packaging apparatus of FIG. 1 on an enlarged scale.

Referring to FIGS. 1 and 2, a packaging apparatus is shown generally at 100. The packaging apparatus 100 has a top 101, a bottom 102, a front 103, a rear 104, a right side 105, and a left side 106. The packaging apparatus 100 includes a steel housing frame structure 110 that defines an interior region 112.

The frame structure 110 supports a supply roll bar 114 in the interior region 112. The supply roll bar 114 extends from side to side as seen in FIG. 1. The frame structure 110 also supports a guide bar 116 that extends from side to side in the interior region 112 near the top 101 and the front 103.

A bag supply roll 120 is rotatably mounted in the interior region 112 by the supply roll bar 114. The bag supply roll 120 includes a plurality of pre-opened bags that are connected to one another along transverse lines of weakness to form a continuous web 121. Each bag is made from at least two layers of thermoplastic material that are sealed together to form the bag.

The bag supply roll 120 is mounted upon the supply roll bar 114 such that the web 121 is fed from the bag supply roll 120 toward the front 103. At the front 103, the web 121 is fed over the guide bar 116 and downward toward the bottom 102 such that the mouth of each bag faces outwardly from the front 103.

An operator may manually pull a lead bag draped over the guide bar 116 to a load station. A blower (not shown) is carried by the frame structure 110 to direct a flow of air into the mouth of the lead bag. The air flow opens and maintains the lead bag in an expanded condition to facilitate loading of an object or objects to be packaged. After loading, the lead bag is severed along its line of weakness connecting the loaded bag to the web 121. This loading process may then be repeated for the next and now lead bag.

Seal Assembly

The packaging apparatus 100 includes a seal assembly 200 to facilitate sealing of the mouth of each loaded bag. As illustrated in FIGS. 1 through 4, the seal assembly 200 includes an elongate, steel pressure member or bar 202 and an elongate seal member or bar 208.

Figure 3:
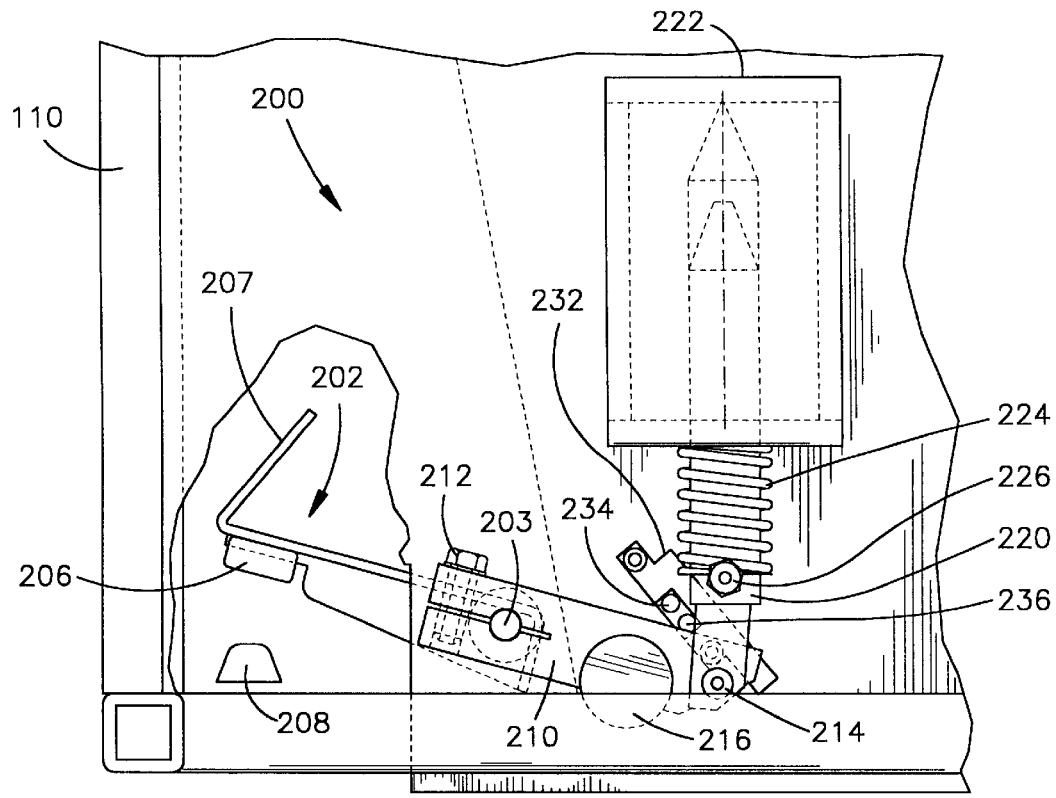
FIG. 3 is a further enlarged, fragmentary, side elevational view of the packaging apparatus of FIG. 1 showing the seal assembly in a spaced position.
Figure 4:
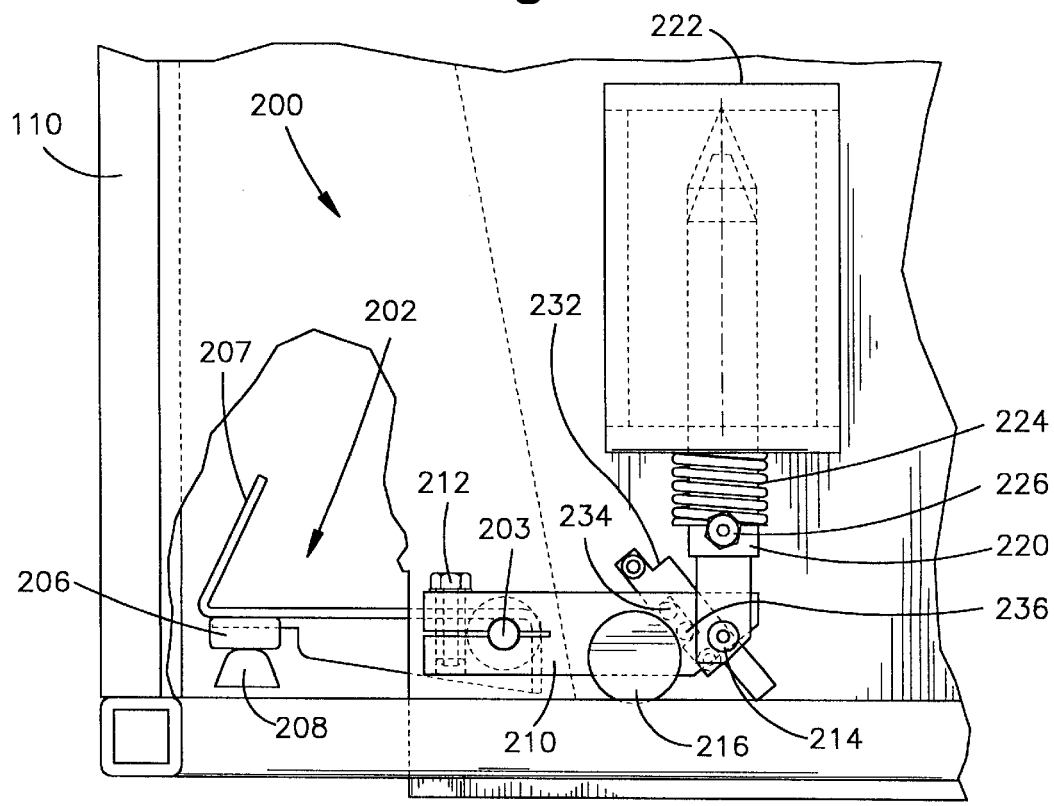
FIG. 4 is a fragmentary, side elevational view on the scale of FIG. 3 of the packaging apparatus of FIG. 1 showing the seal assembly in a seal position.

The seal assembly 200 is normally in an open or spaced position where the pressure member 202 is elevated above and spaced from the seal member 208, as illustrated in FIG. 3. An operator may then insert the layers of material at the mouth of a loaded bag to be sealed between the pressure and seal members 202, 208. The seal assembly 200 has a seal position where the pressure member 202 closes down upon the seal member 208, as illustrated in FIG. 4, to secure the layers of material. The seal member 208 is then heated to effectuate a heat seal between the layers of material and thus seal the loaded bag.

As illustrated in FIG. 1, a pivot bar 203 is rotatably mounted to the frame structure 110. The pivot bar 203 extends from side to side in the interior region 112. The pressure member 202 is mounted on and along the pivot bar 203 near the front 103 and the bottom 102. Spaced bearings 204 and 205 rotatively support end portions of the pivot bar 203.

The pressure member 202 includes an elongate, rubber pressure pad 206 near the front and on the underside of the pressure member 202. The pressure member 202 also includes a steel, elongate shield 207 near the front and on the top of the pressure member 202. The shield 207 helps to deflect objects from falling between the pressure pad 206 and the seal member 208.

The frame structure 110 also carries the seal member 208 such that the seal member 208 extends from side to side in the interior region 112 near the front 103 and the bottom 102 and beneath the pressure member 202. The seal member 208 includes a resistive heating wire made of, for example, nichrome, stainless steel, or any other suitable alloy. The heating wire mounted over a fiberglass platform and secured beneath a Teflon® tape. The heating wire is electrically energizable and serves as a heating element to effectuate heat seals between layers of material.

The frame structure 110 further carries an actuator housing 222 external to the interior region 112 and near the right side 105 of the packaging apparatus 100, as illustrated in FIG. 1. The actuator housing 222 houses an actuator for controlling the upward and downward movement of an elongate, steel actuator arm 220 that extends downward from the actuator housing 222. As illustrated in FIGS. 3 and 4, the arm 220 extends through a spring 224 disposed between the actuator housing 222 and a bolt 226 that passes laterally through the arm 220. The spring 224 biases the arm 220 downward by pushing against the bolt 226, as illustrated in FIG. 3.

The lower end of the arm 220 is connected to the rear end of an elongate, steel link 210 by a bolt 214. The link 210 extends from front to rear as illustrated in FIGS. 1 through 4. The link 210 has an opening near its front end which receives a projecting end portion of the pivot bar 203. A bolt 212 clamps the link 210 around the projecting end portion of the pivot bar 203, as illustrated in FIGS. 3 and 4. An elastomeric bumper 216 is coupled to the link 210 to limit spring-biased downward travel of the link 210.

Control for Seal Assembly

Figure 5:
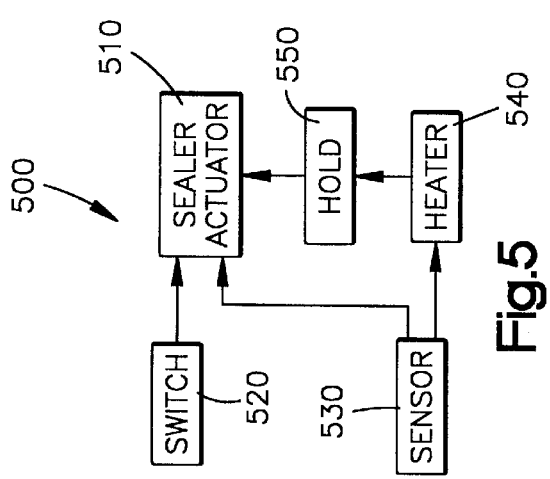
FIG. 5 is a block diagram of a seal assembly control apparatus.

Referring to FIG. 5, a control apparatus 500 controls the positioning of the seal assembly 200 in sealing loaded bags. The control apparatus 500 includes a sealer actuator 510, a switch 520, a sensor 530, a heater 540, and a hold device 550.

Normally, the seal assembly 200 is in an initial open or spaced position as the spring 224 biases the arm 220 downward, pushing downward on the rear end of the link 210 as illustrated in FIG. 3. Because the link 210 clamps the projecting end portion of the pivot bar 203, the pivot bar 203 rotates and lifts the pressure pad 206 into the spaced position away from the seal member 208. The spaced position of the seal assembly 200 allows an operator to insert the layers of material that form the mouth of a loaded bag to be sealed between the pressure pad 206 and the seal member 208.

Upon insertion of the layers of material to be sealed, the operator activates the switch 520. The switch 520 signals the sealer actuator 510 to actuate movement of the seal assembly 200 with an initial, relatively low force from the spaced position toward the seal position.

The sealer actuator 510 includes an electrically energizable solenoid housed in the actuator housing 222 for actuating movement of the arm 220. In response to actuation of the switch 520, the sealer actuator 510 applies an oscillating electrical signal to the solenoid such that the solenoid generates a magnetic field to actuate upward movement of a magnetically permeable plunger attached to the arm 220 with an initial force against the bias created by the spring 224. As the arm 220 pulls the rear end of the link 210 upward, the pivot bar 203 rotates and moves the pressure pad 206 downward toward the seal member 208.

The initial force with which the pressure pad 206 is moved toward the seal member 208 is a relatively soft force and is lower than the clamping force with which the pressure pad 206 is to be applied against the seal member 208 in securing the layers of material for sealing. In this manner, any damage to any objects that become situated or jammed between the pressure member 202 and the seal member 208 may be avoided or minimized. Furthermore, the relatively soft force with which the pressure member 202 is applied toward the seal member 208 can be easily countered by an operator lifting or holding the pressure member 202 away from the seal member 208 to remove any such objects.

The sensor 530 senses when the seal assembly 200 reaches a seal-ready position by determining whether the pressure member 202 has moved within a predetermined distance from the seal member 208. This predetermined distance is preferably a ⅛ inch distance. Relatively few objects can be situated between the pressure pad 206 and the seal member 208 when the seal assembly 200 is in the seal-ready position.

The sensor 530 includes an optical sensor 232 carried by the frame structure 110 as illustrated in FIGS. 1 through 4. The optical sensor 232 defines a sensing region through which the link 210 passes in moving the pressure member 202 toward the seal member 208. The optical sensor 232 includes a radiation source 234 for emitting radiation toward the sensing region. The optical sensor 232 also includes a radiation detector 236 for detecting radiation reflected from the sensing region. The optical sensor 232 is positioned with respect to the link 210 such that the link 210 reflects radiation emitted from the radiation source 234 back to the radiation detector 236 when the pressure pad 206 has moved within the ⅛ inch distance from the seal member 208.

The sensor 530 generates a sensor signal when the sensor 530 senses the seal assembly 200 has reached the seal-ready position. The sealer actuator 510 is coupled to the sensor 530 and in response to the sensor signal applies a relatively constant voltage supply signal to the solenoid (rather than the oscillating signal initially applied to the solenoid) of the sealer actuator 510 such that the solenoid actuates movement of the pressure pad 206 toward the seal member 208 with a clamping or seal force greater than the initial soft force so as to secure or maintain the layers of material against the seal member 208 by the pressure pad 206.

The heater 540 is also coupled to the sensor 530 and in response to the sensor signal actuates heating of the layers of material to effectuate a heat seal between the layers. The heater 540 includes the heating element carried by the seal member 208 for heating the layers of material secured against the seal member 208 by the pressure pad 206.

The heater 540 actuates heating for a period of time in the range of approximately ½ second to approximately 3 seconds to seal the layers of material. Afterwards, the heater 540 terminates heating of the layers of material, and the hold device 550 is actuated to cool the heat seal for a period of time in the range of approximately ¾ second to approximately 2 seconds. This period of time is also termed cooling time or dwell time. The hold device 550 maintains the pressure pad 206 against the seal member 208 for the duration of the dwell time to cool the heat seal.

After cooling, the hold device 550 signals for the release of the sealed layers by the sealer actuator 510. The sealer actuator 510 in response positions the seal assembly 200 in the spaced position by deactivating the solenoid, allowing the spring 224 to bias the arm 220 downward and push downward on the rear end of the link 210. As the pressure pad 206 becomes spaced from the seal member 208, the operator may remove the now sealed layers of material and begin the sealing process again.

Because application of the clamping force and energization of the heating element are not triggered until the pressure pad 206 has reached the seal-ready position, damage to an object that becomes situated or jammed between the pressure pad 206 and the seal member 208 is minimized or avoided. Most objects that might become jammed in the seal assembly 200 will prevent the pressure pad 206 from reaching the seal-ready position. Application of the clamping force and energization of the heating element is therefore inhibited, preventing any physical or heating damage to the jammed object. Furthermore, such objects may be removed in a relatively easy manner because of the relatively soft force with which the pressure member 202 exerts upon such objects.

Control Circuitry for Seal Assembly

Figure 6A:
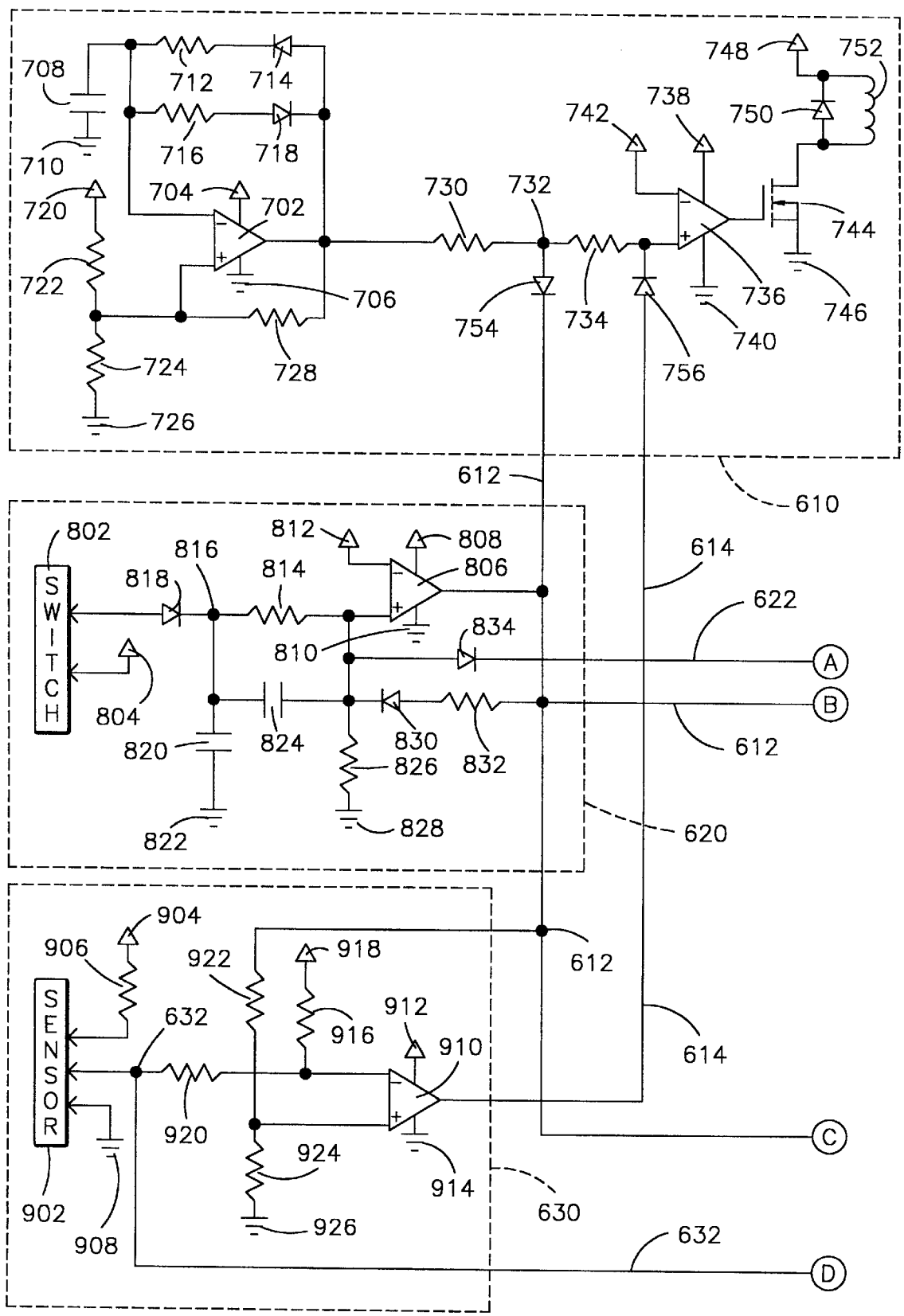
FIGS. 6A and 6B are a circuit diagram of a seal assembly control apparatus.
Figure 6B:
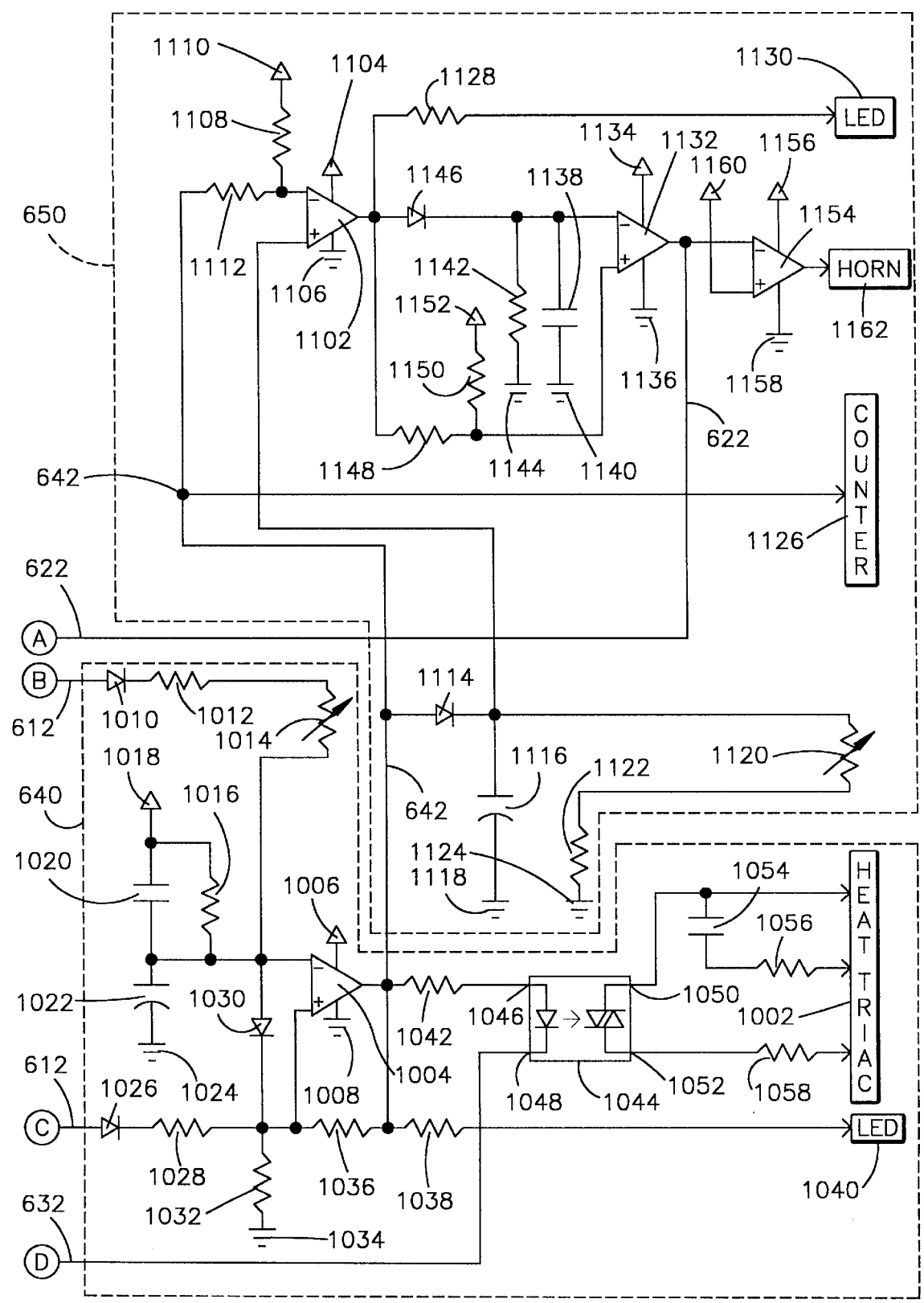

A circuit diagram for implementing the control apparatus 500 is illustrated in FIGS. 6A and 6B. The circuitry of FIG. 6A includes a sealer actuator circuit 610, a switch circuit 620, and a sensor circuit 630. The circuitry of FIG. 6B includes a heater circuit 640 and a hold circuit 650.

The sealer actuator circuit 610 includes an oscillator circuit for generating an oscillating signal. The oscillator circuit includes an operational amplifier or op-amp 702; voltage terminals 704, 706, 710, 720, and 726; resistors 712, 716, 722, 724, and 728; a capacitor 708; and diodes 714 and 718.

The op-amp 702 is powered by the voltage terminals 704 and 706. The capacitor 708 is coupled between the inverting input of the op-amp 702 and the voltage terminal 710. The anode of the diode 714 is coupled to the output of the op-amp 702, and the resistor 712 is coupled between the cathode of the diode 714 and the inverting input of the op-amp 702. The cathode of the diode 718 is coupled to the output of the op-amp 702, and the resistor 716 is coupled between the anode of the diode 718 and the inverting input of the op-amp 702. A voltage divider formed by the resistors 722 and 724 is coupled to the non-inverting input of the op-amp 702. The resistor 722 is coupled between the voltage terminal 720 and the non-inverting input of the op-amp 702, and the resistor 724 is coupled between the voltage terminal 726 and the non-inverting input of the op-amp 702. The resistor 728 is coupled between the output of the op-amp 702 and the non-inverting input of the op-amp 702. The oscillator circuit generates an oscillating signal at the output of the op-amp 702.

The sealer actuator circuit 610 also includes solenoid circuitry for applying electrical signals to a solenoid 752 in positioning the seal assembly 200 in the spaced position and in the seal position. The solenoid 752 corresponds to the solenoid housed in the actuator housing 222 of FIGS. 1 through 4. The solenoid circuitry includes an op-amp 736; voltage terminals 738, 740, 742, 746, and 748; resistors 730 and 734; an n-channel field effect transistor or FET 744; diodes 750, 754, and 756; and the solenoid 752.

The resistor 730 is coupled between the output of the op-amp 702 and a node 732. The resistor 734 is coupled between the node 732 and the non-inverting input of the op-amp 736. The op-amp 736 is powered by the voltage terminals 738 and 740. The inverting input of the op-amp 736 is coupled to the voltage terminal 742. The output of the op-amp 736 is coupled to the gate of the n-channel FET 744. Both the substrate and drain of the n-channel FET 744 are coupled to the voltage terminal 746. The anode of the diode 750 is coupled to the source of the n-channel FET 744, and the cathode of the diode 750 is coupled to the voltage terminal 748. The solenoid 752 is also coupled between the voltage terminal 748 and the source of the n-channel FET 744.

The solenoid circuitry of the sealer actuator circuit 610 has two input terminals 612 and 614 for controlling the application of electrical signals to the solenoid 752. The anode of the diode 754 is coupled to the node 732, and the cathode of the diode 754 is coupled to the input terminal 612. The anode of the diode 756 is coupled to the input terminal 614, and the cathode of the diode 756 is coupled to the non-inverting input of the op-amp 736.

Table I lists pertinent information for the circuit components of the sealer actuator circuit 610.

TABLE I

| Op-amps 702, 736 | National Semiconductor, Part No. LM324AN |
|---|---|
| Voltage terminals 704, 738 | +12 volts |
| Voltage terminals 706, 710, 726, 740, 746 | 0 volts |
| Voltage terminals 720, 742 | +6 volts |
| Voltage terminal 748 | +27 volts |
| Resistor 712 | 47k ohms |
| Resistor 716 | 27k ohms |
| Resistors 722, 724, 728 | 1M ohms |
| Resistors 730, 734 | 10k ohms |
| Capacitor 708 | 0.1M farad |
| Diodes 714, 718, 750, 754, 756 | Part No. 1N914 |
| n-channel FET 744 | Part No. 1RF540 |
| Solenoid 752 | Ledex, 12 volt coil |

The switch circuit 620 includes a mechanically actuated foot switch 802 for actuation by the operator when the operator has inserted layers of material in the seal assembly 200 for sealing. The switch circuit 620 helps control activation and deactivation of the solenoid 752 in positioning the seal assembly 200. The switch circuit 620 also includes an op-amp 806; voltage terminals 804, 808, 810, 812, 822, and 828; resistors 814, 826, and 832; capacitors 820 and 824; and diodes 818, 830, and 834.

The switch 802 is powered by the voltage terminal 804. The op-amp 806 is powered by the voltage terminals 808 and 810. The output of the op-amp 806 is coupled to the input terminal 612 for the sealer actuator circuit 610. The inverting input of the op-amp 806 is coupled to the voltage terminal 812. The resistor 814 is coupled between the non-inverting input of the op-amp 806 and a node 816. The anode of the diode 818 is coupled to the output of the switch 802, and the cathode of the diode 818 is coupled to the node 816. The capacitor 820 is coupled between the node 816 and the voltage terminal 822. The capacitor 824 is coupled between the node 816 and the non-inverting input of the op-amp 806. The resistor 826 is coupled between the non-inverting input of the op-amp 806 and the voltage terminal 828. The cathode of the diode 830 is coupled to the non-inverting input of the op-amp 806. The resistor 832 is coupled between the terminal 612 and the anode of the diode 830. The switch circuit 620 has a terminal 622. The anode of the diode 834 is coupled to the non-inverting input of the op-amp 806, and the cathode of the diode 834 is coupled to the terminal 622.

Table II lists pertinent information for the circuit components of the switch circuit 620.

TABLE II

| Op-amp 806 | National Semiconductor, Part No. LM324AN |
|---|---|
| Voltage terminals 804, 808 | +12 volts |
| Voltage terminals 810, 822, 828 | 0 volts |
| Voltage terminal 812 | +6 volts |
| Resistor 814 | 330k ohms |
| Resistor 826 | 100k ohms |
| Resistor 832 | 1k ohms |
| Capacitors 820, 824 | 0.33M farad |
| Diodes 818, 830, 834 | Part No. 1N914 |

The sensor circuit 630 includes a sensor 902 for sensing when the seal assembly 200 has reached the seal-ready position. The sensor 902 corresponds to the optical sensor 232 of FIGS. 1 through 4. The sensor circuit 630 generates a sensor signal to control the application of electrical signals to the solenoid 752 and to control energization of the heating element of the seal member 208. The sensor circuit 630 also includes an op-amp 910; voltage terminals 904, 908, 912, 914, 918, and 926; and resistors 906, 916, 920, 922, and 924.

The sensor 902 is powered by the voltage terminals 904 and 908. The resistor 906 is coupled between the voltage terminal 904 and the sensor 902. The op-amp 910 is powered by the voltage terminals 912 and 914. The output of the op-amp 910 is coupled to the input terminal 614 for the sealer actuator circuit 610. The resistor 916 is coupled between the voltage terminal 918 and the inverting input of the op-amp 910. The resistor 920 is coupled between the inverting input of the op-amp 910 and an output of the sensor 902 at a node 632. The sensor circuit 630 has an output terminal at the node 632. A voltage divider formed by the resistors 922 and 924 is coupled to the non-inverting input of the op-amp 910. The resistor 922 is coupled between the terminal 612 and the non-inverting input of the op-amp 910, and the resistor 924 is coupled between the voltage terminal 926 and the non-inverting input of the op-amp 910.

Table III lists pertinent information for the circuit components of the sensor circuit 630.

TABLE III

| Sensor 902 | Sharp ®, Optical Proximity Sensor Part No. GP2A22 |
|---|---|
| Op-amp 910 | National Semiconductor, Part No. LM324AN |
| Voltage terminals 904, 912, 918 | +12 volts |
| Voltage terminals 908, 914, 926 | 0 volts |
| Resistor 906 | 1.2k ohms |
| Resistors 916, 922, 924 | 10k ohms |
| Resistor 920 | 1k ohms |

The heater circuit 640 includes a heat triac 1002 for actuating heating of the layers of material to effectuate a heat seal. The heat triac 1002 energizes the heating element of the seal member 208 for the seal assembly 200. The heater circuit 640 also includes an op-amp 1004; voltage terminals 1006, 1008, 1018, 1024, and 1034; resistors 1012, 1016, 1028, 1032, 1036, 1038, 1042, 1056, and 1058; a variable resistor 1014; capacitors 1020, 1022, and 1054; diodes 1010, 1026, and 1030; an optocoupler 1044; and a light emitting diode or LED 1040.

The op-amp 1004 is powered by the voltage terminals 1006 and 1008. The anode of the diode 1010 is coupled to the terminal 612. The resistor 1012 is coupled between the cathode of the diode 1010 and the variable resistor 1014. The variable resistor 1014 is coupled between the resistor 1012 and the inverting input of the op-amp 1004. The resistor 1016 is coupled between the voltage terminal 1018 and the inverting input of the op-amp 1004. The capacitor 1020 is also coupled between the voltage terminal 1018 and the inverting input of the op-amp 1004. The capacitor 1022 is coupled between the inverting input of the op-amp 1004 and the voltage terminal 1024.

The anode of the diode 1026 is coupled to the terminal 612. The resistor 1028 is coupled between the cathode of the diode 1026 and the non-inverting input of the op-amp 1004. The anode of the diode 1030 is coupled to the inverting input of the op-amp 1004, and the cathode of the diode 1030 is coupled to the non-inverting input of the op-amp 1004. The resistor 1032 is coupled between the non-inverting input of the op-amp 1004 and the voltage terminal 1034. The resistor 1036 is coupled between the non-inverting input of the op-amp 1004 and the output of the op-amp 1004. The resistor 1038 is coupled between the output of the op-amp 1004 and the LED 1040. The resistor 1042 is coupled between a terminal 1046 of the optocoupler 1044 and the output of the op-amp 1004. The heater circuit 640 has an output terminal 642 at the output of the op-amp 1004. Another terminal 1048 of the optocoupler 1044 is coupled to the output terminal 632 of the sensor circuit 630.

The high terminal of the heat triac 1002 is coupled to the terminal 1050 of the optocoupler 1044. The capacitor 1054 and the resistor 1056 are coupled in series between the terminal 1050 and the common or low terminal of the heat triac 1002. The resistor 1058 is coupled between the terminal 1052 of the optocoupler 1044 and the gate terminal of the heat triac 1002.

Table IV lists pertinent information for the circuit components of the heater circuit 640.

TABLE IV

| Heat triac 1002 | 30 ampere triac |
| --- | --- |
| Op-amp 1004 | National Semiconductor, Part No. LM324AN |
| Voltage terminals 1006, 1018 | +12 volts |
| Voltage terminals 1008, 1024, 1034 | 0 volts |
| Resistor 1012 | 10k ohms |
| Variable Resistor 1014 | 0–500k ohms |
| Resistors 1016, 1036 | 1M ohms |
| Resistors 1028, 1032 | 100k ohms |
| Resistors 1038, 1042 | 1k ohms |
| Resistor 1056 | 100 ohms |
| Resistor 1058 | 47 ohms |
| Capacitor 1020 | 0.33M farads |
| Capacitor 1022 | 10M farads |
| Capacitor 1054 | 0.022M farads |
| Diodes 1010, 1026, 1030 | Part No. 1N914 |
| Optocoupler 1044 | Motorola, Triac Driver Part No. M0C3011 |

The hold circuit 650 maintains the seal assembly 200 in the seal position after heating to allow the heat seal to cool. The hold circuit 650 then signals for the release of the sealed layers by the sealer actuator circuit 610. The hold circuit 650 includes op-amps 1102, 1132, and 1154; voltage terminals 1104, 1106, 1110, 1118, 1124, 1134, 1136, 1140, 1144, 1152, 1156, 1158, and 1160; resistors 1108, 1112, 1122, 1128, 1142, 1148, and 1150; a variable resistor 1120; capacitors 1116 and 1138; diodes 1114 and 1146; an LED 1130; a counter 1126; and a horn 1162.

The op-amp 1102 is powered by the voltage terminals 1104 and 1106. The resistor 1108 is coupled between the voltage terminal 1110 and the inverting input of the op-amp 1102. The resistor 1112 is coupled between the inverting input of the op-amp 1102 and the output terminal 642 for the heater circuit 640. The anode of the diode 1114 is coupled to the output terminal 642, and the cathode of the diode 1114 is coupled to the non-inverting input of the op-amp 1102. The capacitor 1116 is coupled between the non-inverting input of the op-amp 1102 and the voltage terminal 1118. The variable resistor 1120 and the resistor 1122 are coupled in series between the non-inverting input of the op-amp 1102 and the voltage terminal 1124. The counter 1126 is coupled to the output terminal 642. The resistor 1128 is coupled between the output of the op-amp 1102 and the LED 1130.

The op-amp 1132 is powered by the voltage terminals 1134 and 1136. The capacitor 1138 is coupled between the inverting input of the op-amp 1132 and the voltage terminal 1140. The resistor 1142 is coupled between the inverting input of the op-amp 1132 and the voltage terminal 1144. The anode of the diode 1146 is coupled to the output of the op-amp 1102, and the cathode of the diode 1146 is coupled to the inverting input of the op-amp 1132. The resistor 1148 is coupled between the output of the op-amp 1102 and the non-inverting input of the op-amp 1132. The resistor 1150 is coupled between the non-inverting input of the op-amp 1132 and the voltage terminal 1152. The output of the op-amp 1132 is coupled to the terminal 622 for the switch circuit 620.

The op-amp 1154 is powered by the voltage terminals 1156 and 1158. The inverting input of the op-amp 1154 is coupled to the output of the op-amp 1132. The non-inverting input of the op-amp 1154 is coupled to the voltage terminal 1160. The output of the op-amp 1154 is coupled to the horn 1162.

Table V lists pertinent information for the circuit components of the hold circuit 650.

TABLE V

| Op-amps 1102, 1132, 1154 | National Semiconductor, Part No. LM324AN |
| --- | --- |
| Voltage terminals 1104, 1110, 1134, 1152, 1156 | +12 volts |
| Voltage terminals 1106, 1118, 1124, 1136, 1140, 1144, 1158 | 0 volts |
| Voltage terminal 1160 | +6 volts |
| Resistor 1108 | 220k Ohms |
| Resistor 1112, 1150 | 100k Ohms |
| Variable Resistor 1120 | 0–500k Ohms |
| Resistor 1122 | 10k Ohms |
| Resistor 1128 | 1k Ohms |
| Resistor 1142 | 1M Ohms |
| Resistor 1148 | 33k Ohms |
| Capacitor 1116 | 4.7M farads |
| Capacitor 1138 | 0.33M farads |
| Diodes 1114, 1146 | Part No. 1N914 |

Control Circuitry Operation for Seal Assembly

Initially, the switch 802 of the switch circuit 620 is deactivated, and therefore the voltage held at the inverting input of the op-amp 806 by the voltage terminal 812 is greater than that at the non-inverting input of the op-amp 806. The op-amp 806 therefore grounds the input terminal 612 of the sealer actuator circuit 610. For the sensor circuit 630, the voltage at the non-inverting input of the op-amp 910 is grounded by the terminal 612 and less than the voltage at the inverting input of the op-amp 910. The op-amp 910 therefore grounds the input terminal 614 of the sealer actuator circuit 610.

For the sealer actuator circuit 610, the voltage terminal 742 holds the inverting input of the op-amp 736 at a voltage greater than that at the non-inverting input of the op-amp 736. Because the n-channel FET 744 is switched off by the grounded signal output from the op-amp 736, the solenoid 752 is deactivated and allows the spring 224 to bias the seal assembly 200 in the spaced position.

Upon insertion of the layers of material to be sealed in the seal assembly 200, the operator activates the switch 802 to couple the voltage terminal 804 to the anode of the diode 818. As the non-inverting input of the op-amp 806 becomes greater than that at the inverting input of the op-amp 806, the op-amp 806 outputs an approximately +12 volt signal to the terminal 612 to reverse-bias the diode 754 of the sealer actuator circuit 610. The signal at the terminal 612 also becomes latched as the output from the op-amp 806 is fed-back through the resistor 832 and the diode 830 to the non-inverting input of the op-amp 806. In this manner, the op-amp 806 continues to output the approximately +12 volt signal regardless of continued activation or deactivation of the switch 802. The capacitors 820 and 824 serve as noise immunity devices for the switch circuit 620.

Because the diode 754 is reverse-biased and the input terminal 614 is grounded, the oscillating signal generated at the output of the op-amp 702 is input to the non-inverting input of the op-amp 736. The op-amp 736 switches the FET 744 on and off as the voltage at the non-inverting input of the op-amp 736 oscillates above and below the voltage held at the inverting input of the op-amp 736 by the voltage terminal 742. An oscillating electrical signal is therefore applied to the solenoid 752, actuating movement of the seal assembly 200 with the initial, relatively soft force from the spaced position toward the seal position.

For the sensor circuit 630, the approximately +12 volt signal at the terminal 612 provides, through the voltage divider formed by the resistors 922 and 924, an approximately +6 volt signal at the non-inverting input of the op-amp 910. When the sensor 902 senses the seal assembly 200 has reached the seal-ready position, the sensor 902 grounds the terminal 632. The voltage at the voltage terminal 918 provides, through the voltage divider formed by the resistors 916 and 920, a voltage at the inverting input of the op-amp 910 less than the approximately +6 volt signal at the non-inverting input of the op-amp 910. The op-amp 910 then outputs an approximately +12 volt signal at the input terminal 614 for the sealer actuator circuit 610.

For the sealer actuator circuit 610, the signal at the terminal 614 overrides the oscillating signal at the non-inverting input of the op-amp 736 and causes the op-amp 736 to maintain the FET 744 in a switched-on state. A relatively constant voltage signal is therefore applied to the solenoid 752, actuating movement of the seal assembly 200 with the clamping or seal force toward the seal position.

The sensor circuit 630 also actuates the heating and thereby sealing of the layers of material by the heater circuit 640. The approximately +12 volt signal generated at the terminal 612 in response to activation of the switch 802 begins to charge the capacitor 1022 through the diode 1010, the resistor 1012, and the variable resistor 1014. The voltage at the terminal 612 also provides, through the voltage divider formed by the resistors 1028 and 1032, a voltage at the non-inverting input of the op-amp 1004 initially greater than that at the inverting input of the op-amp 1004. The op-amp 1004 then outputs an approximately +12 volt signal at the terminal 642, activating the LED 1040.

With the positive voltage at the terminal 1046 of the optocoupler 1044, the optocoupler 1044 becomes activated when the sensor 902 senses the seal assembly 200 has reached the seal-ready position and grounds the terminal 1048 of the optocoupler 1044 by grounding the terminal 632 of the sensor circuit 630. The optocoupler 1044 then electrically connects the terminals 1050 and 1052 of the optocoupler 1044 to actuate the heat triac 1002.

The heat triac 1002 remains actuated until the capacitor 1022 is sufficiently charged so as to provide a voltage at the inverting input of the op-amp 1004 greater than that at the non-inverting input of the op-amp 1004. The op-amp 1004 then outputs a grounded signal at the terminal 642, deactivating the optocoupler 1044 to switch off the heat triac 1002 and activating the hold circuit 650 to maintain the seal assembly 200 in the seal position for a period of time to allow the heat seal to cool.

For the hold circuit 650 prior to activation of the switch 802, the terminal 642 is grounded by the op-amp 1004 of the heater circuit 640. The voltage terminal 1110 provides, through the voltage divider formed by the resistors 1108 and 1112, a voltage at the inverting input of the op-amp 1102 greater than that at the non-inverting input of the op-amp 1102, causing the op-amp 1102 to output a grounded signal. As the voltage terminal 1152 provides, through the voltage divider formed by the resistors 1148 and 1150, a voltage at the non-inverting input of the op-amp 1132 greater than that at the inverting input of the op-amp 1132, the op-amp 1132 outputs an approximately +12 volt signal at the terminal 622 to reverse-bias the diode 834 of the switch circuit 620. This approximately +12 volt signal is also input to the inverting input of the op-amp 1154 and is greater than the voltage held at the non-inverting input of the op-amp 1154 by the voltage terminal 1160. The op-amp 1154 therefore outputs a grounded signal to deactivate the horn 1162.

Upon activation of the switch 802, the approximately +12 volt signal generated at the terminal 642 by the heater circuit 640 begins to charge the capacitor 1116 through the diode 1114. As discussed above, the heater circuit 640 continues to generate the approximately +12 volt signal at the terminal 642 until the heating time has expired as determined by the charging of the capacitor 1022 of the heater circuit 640. The heater circuit 640 then grounds the terminal 642, allowing the capacitor 1116 to discharge through the variable resistor 1120 and the resistor 1122 and provide a voltage at the non-inverting input of the op-amp 1102 greater than that at the inverting input of the op-amp 1102. The op-amp 1102 then outputs an approximately +12 volt signal to activate the LED 1130 and to begin charging the capacitor 1138.

The op-amp 1132 continues to output an approximately +12 volt signal, maintaining the deactivation of the horn 1162. When the voltage at the non-inverting input of the op-amp 1102 becomes less than that at the inverting input of the op-amp 1102 because of the discharge of the capacitor 1116, the op-amp 1102 outputs a grounded signal to deactivate the LED 1130 and end the cooling time period.

The capacitor 1138 then discharges through the resistor 1142, providing a voltage at the inverting input of the op-amp 1132 greater than that at the non-inverting input of the op-amp 1132. As the op-amp 1132 responds by grounding the terminal 622, the horn 1162 is activated by the op-amp 1154 until the voltage at the inverting input of the op-amp 1132 becomes less than that at the non-inverting input of the op-amp 1132 and the op-amp 1132 outputs an approximately +12 volt signal to deactivate the horn 1162.

The grounding of the terminal 622 also places a forward-bias on the diode 834 of the switch circuit 620, pulling the voltage at the non-inverting input of the op-amp 806 below that at the inverting input of the op-amp 806. As the op-amp 806 grounds the terminal 612, the voltage at the non-inverting input of the op-amp 910 is pulled below that at the inverting input of the op-amp 910 for the sensor circuit 630 and the op-amp 910 grounds the input terminal 614. With the grounded input terminals 612 and 614, the sealer actuator circuit 610 deactivates the solenoid 752 and allows the spring 224 to actuate movement of the seal assembly 200 to the spaced position. The operator may then remove the now sealed layers of material and begin the sealing process again for other layers of material to be sealed.

As more and more loaded bags are sealed, the counter 1126 of the hold circuit 650 may be used to maintain a count of the number bags that have been sealed by the seal assembly 200. The counter 1126 increments its count in response to the approximately +12 volt signal output by the op-amp 1004 onto the terminal 642 of the heater circuit 640 each time a heat seal is effectuated as discussed above.

In the event a foreign object does become situated or jammed between the pressure pad 206 and the seal member 208 after actuation of the switch 802 by the operator, the circuitry of FIGS. 6A and 6B continues to function as described above. Once the switch 802 has been activated, the sealer actuator circuit 610 continues to apply an oscillating signal to the solenoid 752 to move the pressure member 202 with a relatively soft force toward the seal member 208. The operator may therefore remove any such objects with relative ease by lifting or holding the pressure member 202.

For most instances where a foreign object might become situated or jammed between the pressure member 202 and the seal member 208, the sensor 902 of the sensor circuit 630 does not ground the terminal 632 as the pressure pad 206 is prevented by the obstructing object from reaching the seal-ready position. Because the op-amp 910 therefore continues to ground the terminal 614, the sealer actuator circuit 610 does not apply a constant voltage signal to the solenoid 752 for movement of the pressure member 202 with any clamping or seal force. Furthermore, the optocoupler 1044 of the heater circuit 640 remains deactivated because the terminal 1048 of the optocoupler 1044 does not become grounded. The heat triac 1002 and hence the heating element carried by the seal member 208 therefore remain deactivated.

Although the sensor 902 prevents energization of the heating element, the heater circuit 640 nevertheless continues to generate in response to activation of the switch 802 an approximately +12 volt signal onto the terminal 642 for the period of time determined by the charging of the capacitor 1022, as discussed above. The hold circuit 650 in response waits for the period of time determined by the discharging of the capacitor 1116, as discussed above, and grounds the terminal 622. As terminal 612 becomes grounded by the op-amp 806, the sealer actuator circuit 610 deactivates the solenoid 752 and allows the spring 224 to bias the seal assembly 200 in the spaced position. If the operator failed to remove any obstructing objects, then, the circuitry of FIGS. 6A and 6B will cycle through the heating and cooling time periods and return the seal assembly 200 to the spaced position for the release of any such objects.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method for forming a seal between at least two layers of material, the method comprising the steps of:
    (a) actuating a seal assembly to move with a relatively low force from a spaced position toward a seal position to seal the at least two layers of material, wherein the actuating step (a) includes the step of applying a first electrical signal to a solenoid operatively coupled to the seal assembly;
    (b) sensing when the seal assembly has reached a seal-ready position;
    (c) actuating, in response to the sensing step (b), the seal assembly to move to the seal position with a seal force greater than the low force, wherein the actuating step (c) includes the step of applying to the solenoid a second electrical signal different from the first electrical signal; and
    (d) sealing the at least two layers of material when the seal assembly is in the seal position.

2. The method of claim 1, wherein at least one of the layers of material includes a thermoplastic material.

3. The method of claim 1, wherein the actuating step (a) includes the step of actuating the seal assembly to move with the low force in response to a switch controlled by an operator.

4. The method of claim 1, wherein the seal assembly includes a link for moving a pressure member toward a seal member to position the seal assembly in the seal position, the link passing through a sensing region in moving the pressure member toward the seal member; and
    wherein the sensing step (b) includes the steps of:
        (i) emitting radiation toward the sensing region, and
        (ii) detecting radiation reflected from the sensing region by the link to determine when the pressure member has reached the seal-ready position.

5. The method of claim 1, wherein the actuating step (c) includes the step of energizing a heating element of the seal assembly in response to the sensing step (b); and
    wherein the sealing step (d) includes the step of heating the at least two layers of material with the heating element.

6. The method of claim 1, wherein the first electrical signal is an oscillating signal.

7. An apparatus for moving a seal assembly from a spaced position to a seal position, the seal assembly including relatively moveable components, the apparatus comprising:
    (a) a solenoid operatively interposed between the components for relatively moving the components from the spaced position to the seal position;
    (b) a sensor for generating a sensor signal when the components have reached a seal-ready position; and
    (c) circuitry coupled to the solenoid and to the sensor, the circuitry responsive to a switch for applying a first electrical signal to the solenoid to move the components with a relatively low force toward the seal position, the circuitry being responsive to the sensor signal for applying to the solenoid a second electrical signal different from the first electrical signal to move the components, when in the seal-ready position, with a seal force greater than the low force to the seal position.

8. The apparatus of claim 7, wherein the switch is an operator controlled switch.

9. The apparatus of claim 7, wherein the relatively moveable components include a link component, a pressure member, and a seal member, the link component being operatively connected to the pressure member to move the pressure member toward the seal member to position the seal assembly in the seal position, the link component passing through a sensing region in moving the pressure member toward the seal member; and wherein the sensor includes an optical sensor comprising a radiation source for emitting radiation toward the sensing region and comprising a radiation detector for detecting radiation reflected from the sensing region by the link component to determine when the pressure member has reached the seal-ready position.

10. The apparatus of claim 7, wherein the seal assembly comprises a heating element coupled to the sensor, the heating element being heated to a seal effecting temperature in response to the sensor signal to seal at least two layers of material when the seal assembly is in the seal position.

11. The apparatus of claim 7, wherein the first electrical signal is an oscillating signal.

12. An apparatus for forming a seal between at least two layers of material, the apparatus comprising:

(a) a seal member;

(b) a pressure member for securing the at least two layers of material in relation to the seal member;

(c) support structure supporting the seal member and the pressure member, the support structure being for positioning the pressure member and the seal member in a spaced position to allow the at least two layers of material to be inserted between the pressure member and the seal member and in a seal position to seal the at least two layers of material;

(d) a sensor operatively connected with the support structure for generating a sensor signal when the pressure member and the seal member reach a seal-ready position;

(e) an actuator operatively connected with the support structure and coupled to the sensor, the actuator comprising:

(i) a solenoid for providing relative movement of the pressure member and the seal member, and (ii) circuitry coupled to the solenoid and to the sensor for applying a first electrical signal to the solenoid to actuate relative movement of the pressure member and the seal member from the spaced position toward the seal position with a relatively low force, the circuitry responsive to the sensor signal for applying to the solenoid a second electrical signal different from the first electrical signal to actuate relative movement of the pressure member and the seal member with a seal force greater than the low force when in the seal position; and (f) a heating element carried by the seal member for heating the at least two layers of material when the pressure member and the seal member are in the seal position.

13. The apparatus of claim 12, wherein at least one of the layers of material includes a thermoplastic material.

14. The apparatus of claim 12 wherein the heating element is coupled to the sensor and is heated to a seal effecting temperature to seal the at least two layers of material in response to the sensor signal.

15. The apparatus of claim 12, wherein the actuator is responsive to an operator controlled switch to move the pressure member and the seal member with the low force.

16. The apparatus of claim 12, wherein the sensor defines a sensing region, wherein the support structure passes through the sensing region in providing relative movement of the pressure member and the seal member toward the seal position, wherein the sensor includes a radiation source for emitting radiation in the sensing region, and wherein the sensor includes a detector for detecting radiation reflected from the sensing region by the support structure to determine when the pressure member and the seal member have reached the seal-ready position.

17. The apparatus of claim 12, wherein the first electrical signal is an oscillating signal.

18. The apparatus of claim 12, in combination with a packaging machine for packaging objects with the at least two layers of material.

19. A heat sealer for forming heat seals between at least two layers of thermoplastic material, the sealer comprising:

(a) an elongate seal bar including an electrically energizable heating element;

(b) an elongate pad for coacting with the bar to effect heat seals therebetween;

(c) support structure for supporting the pad and bar, the support structure for positioning the pad and bar in a spaced plastic insertion and release position and in a seal position, the pad and bar being spaced when in the insertion position to enable plastic layers to be sealed to be inserted between the pad and bar and removal of sealed plastic layers from between the pad and bar;

(d) an electrically energizable actuator operably connected to the support structure for actuating relative movement of the pad and bar between said insertion and said seal positions, wherein the actuator comprises a solenoid;

(e) a position sensing means operably connected to the actuator for sensing the arrival of the pad and bar at the seal position on movement from the release position and sending a control signal to the actuator upon sensing such an arrival; and, (f) the actuator including means for applying a first signal to the solenoid to establish a low closing force when actuating relative movement of the pad and bar from the insertion to the seal position and for applying to the solenoid, in response to the control signal, a second signal different from the first signal to increase the closing force to produce a seal effecting pressure on a pair of plastic layers between the pad and bar.

20. The sealer of claim 19 wherein the low closing force is maintained until the control signal is received whereby if an object obstructs relative pad and bar movement from the insertion to the seal position damage of the object will be minimized or avoided.

21. The sealer of claim 19 wherein the heating element is actuated in response to the control signal.

22. The sealer of claim 19, wherein the first signal is an oscillating signal.

* * * * *